United States Patent
Zhang et al.

(10) Patent No.: US 10,140,915 B2
(45) Date of Patent: Nov. 27, 2018

(54) DISPLAY DEVICE, DISPLAY SYSTEM AND DISPLAY METHOD

(71) Applicants: BOE TECHNOLOGY GROUP CO., LTD., Beijing (CN); BEIJING BOE DISPLAY TECHNOLOGY CO., LTD., Beijing (CN)

(72) Inventors: Chunbing Zhang, Beijing (CN); Xianjuan Zhan, Beijing (CN); Yichiang Lai, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/245,950

(22) Filed: Aug. 24, 2016

(65) Prior Publication Data

US 2017/0213503 A1    Jul. 27, 2017

(30) Foreign Application Priority Data

Jan. 27, 2016  (CN) .......................... 2016 1 0056674

(51) Int. Cl.
*G09G 5/00*     (2006.01)
*G09G 3/3208*   (2016.01)
(Continued)

(52) U.S. Cl.
CPC .......... *G09G 3/3208* (2013.01); *G02F 1/137* (2013.01); *G02F 1/1336* (2013.01);
(Continued)

(58) Field of Classification Search
CPC .......... G09G 3/3208; G09G 2320/064; G09G 2310/0237; G09G 2310/08;
(Continued)

(56) References Cited

U.S. PATENT DOCUMENTS

| 2013/0076785 | A1* | 3/2013 | Chen | ...................... G09G 3/001 |
| | | | | 345/629 |
| 2015/0160492 | A1 | 6/2015 | Li et al. | |
| 2015/0379911 | A1 | 12/2015 | Chen et al. | |

FOREIGN PATENT DOCUMENTS

| CN | 102222492 A | 10/2011 |
| CN | 102510435 A | 6/2012 |

(Continued)

OTHER PUBLICATIONS

First Office Action regarding Chinese Application No. 201610056674.2, dated Jul. 3, 2017. Translation provided by Dragon Intellectual Property Law Firm.

*Primary Examiner* — Jonathan Boyd
(74) *Attorney, Agent, or Firm* — Harness, Dickey & Pierce, P.L.C.

(57) ABSTRACT

The present disclosure provides a display device, a display system and a display method. The display device includes a driver circuit, a display panel, and an interference unit arranged at a display side of the display panel. The driver circuit is configured to drive the display panel to display an image, and a time period for each frame of the image includes a display period and an interference period. During the display period, the interference unit is in a transparent state so as to enable light beams from the display panel to pass through the interference unit, and during the interference period, the interference unit is in an interference state so as to interfere with the light beams from the display panel.

19 Claims, 3 Drawing Sheets

(51) Int. Cl.
*G02F 1/137* (2006.01)
*G02F 1/133* (2006.01)
*G02F 1/163* (2006.01)
*G02F 1/1347* (2006.01)
*G02F 1/13357* (2006.01)
*G09G 3/34* (2006.01)
*G02F 1/1335* (2006.01)
*G09G 3/36* (2006.01)

(52) U.S. Cl.
CPC ........ *G02F 1/1347* (2013.01); *G02F 1/13306* (2013.01); *G02F 1/163* (2013.01); *G09G 3/3406* (2013.01); *G02F 2001/133601* (2013.01); *G09G 3/3611* (2013.01); *G09G 2310/0237* (2013.01); *G09G 2310/08* (2013.01); *G09G 2320/064* (2013.01); *G09G 2358/00* (2013.01)

(58) Field of Classification Search
CPC . G09G 2330/021; G02F 1/1336; G02F 1/137; G02F 1/13306; G02F 1/163; G02F 1/1347; G02F 2001/133601
See application file for complete search history.

(56) References Cited

FOREIGN PATENT DOCUMENTS

| | | |
|---|---|---|
| CN | 103293757 A | 9/2013 |
| CN | 104020599 A | 9/2014 |
| CN | 104134282 A | 11/2014 |
| CN | 105137654 A | 12/2015 |
| WO | WO-2007-043577 A1 | 4/2007 |

\* cited by examiner

DISPLAY DEVICE, DISPLAY SYSTEM AND DISPLAY METHOD

CROSS-REFERENCE TO RELATED APPLICATION

The present application claims a priority of the Chinese patent application No. 201610056674.2 filed on Jan. 27, 2016, which is incorporated herein by reference in its entirety.

TECHNICAL FIELD

The present disclosure relates to the field of display technology, in particular to a display device, a display system and a display method for privacy.

BACKGROUND

Such display devices as desktop computers, laptop computers, mobile phones and digital cameras have been widely used nowadays, and there is an urgent need to prevent the other people from peeping at information displayed by the display device, especially for a special industry where confidential information needs to be viewed.

SUMMARY

An object of the present disclosure is to provide a display device, a display system and a display method, so as to prevent the other people from peeping at information displayed by the display device.

In one aspect, the present disclosure provides in some embodiments a display device, including a driver circuit, a display panel, and an interference unit arranged at a display side of the display panel. The driver circuit is configured to drive the display panel to display an image, and a time period for each frame of the image includes a display period and an interference period. During the display period, the interference unit is in a transparent state so as to enable light beams from the display panel to pass through the interference unit, and during the interference period, the interference unit is in an interference state so as to interfere with the light beams from the display panel.

Optionally, the interference unit includes a front light source, which is turned off during the display period so as to be in the transparent state, and which is turned on during the interference period to emit light so as to be in the interference state.

Optionally, the front light source is a transparent white organic light-emitting diode (OLED) substrate.

Optionally, the display device further includes a first controller configured to turn off the front light source so as to enable the front light source to be in the transparent state, or turn on the front light source so as to enable the front light source to emit light, thereby to enable the front light source to be in the interference state.

Optionally, the interference unit includes a light valve, which is turned on during the display period so as to be in the transparent state, and which is turned off during the interference period so as to be in the interference state.

Optionally, the light valve is a liquid crystal light valve.

Optionally, the light valve is an electrochromic unit.

Optionally, the display device further includes a second controller configured to turn on the light valve so as to enable the light valve to be in the transparent state, or turn off the light valve so as to enable the light valve to be in the interference state.

Optionally, the display panel is a liquid crystal display panel, and the display device further includes a backlight source which is turned on during the display period, and which is turned on or turned off during the interference period.

Optionally, the display panel is an OLED display panel.

Optionally, the display device further includes a third controller configured to turn on or turn off the backlight source.

In another aspect, the present disclosure provides in some embodiments a display system including the above-mentioned display device, and a pair of shutter glasses which is in a transparent state during the display period and which is in a light-shielding state during the interference period.

Optionally, the pair of shutter glasses includes a first communication module, and the display device includes a second communication module in communication with the first communication module, and a synchronization module configured to synchronize the transparent state and the interference state of the interference unit with the transparent state and the light-shielding state of the pair of shutter glasses respectively.

Optionally, the synchronization module is further configured to control the pair of shutter glasses to be in the transparent state when the interference unit is in the transparent state, control the pair of the shutter glasses to be in the light-shielding state when the interference unit is in the interference state, and enable a switching frequency of the interference unit between the transparent state and the interference state to be identical to a switching frequency of the pair of shutter glasses between the transparent state and the light-shielding state.

In yet another aspect, the present disclosure provides in some embodiments a display method, including steps of: providing an image for a display panel, a time period for each frame of the image including a display period and an interference period; enabling an interference unit at a display side of the display panel to be in a transparent state during the display period, so as to enable light beams from the display panel to pass through interference unit; and enabling the interference unit to be in an interference state during the interference period, so as to interfere with the light beams from the display panel.

In still yet another aspect, the present disclosure provides in some embodiments a display method for the above-mentioned display system, including steps of: providing an image for a display panel, where a time period for each frame includes a display period and an interference period; enabling an interference unit at a display side of the display panel to be in a transparent state during the display period, so as to enable light beams from the display panel to pass through the interference unit; and enabling the interference unit to be in an interference state during the interference period, so as to interfere with the light beams from the display panel.

Optionally, the interference unit is in the transparent state during the display period, and the interference unit is turned on during the interference period to emit light so as to be in the interference state.

Optionally, the pair of shutter glasses is in the transparent state during the display period, and the pair of shutter glasses is in the light-shielding state during the interference period.

Optionally, the interference unit is turned on during the display period so as to be in the transparent state, and the interference unit is turned off during the interference period so as to be in the interference state.

Optionally, the pair of shutter glasses is in the transparent state during the display period, and the pair of shutter glasses is in the light-shielding state during the interference period.

According to the embodiments of the present disclosure, the time period for one frame includes the display period and the interference period. During the display period, the interference unit at the display side of the display panel is in the transparent state so as to enable the light beams from the display panel to pass through the interference unit, and within the interference period, the interference unit is in the interference state so as to interfere with the light beams from the display panel. An interference signal from the display device may be eliminated by the pair of shutter glasses, so as to enable a user to view the image normally. As a result, it is able to prevent the other people who do not wear a pair of shutter glasses from peeping at the image displayed by the display device.

Figure 1:
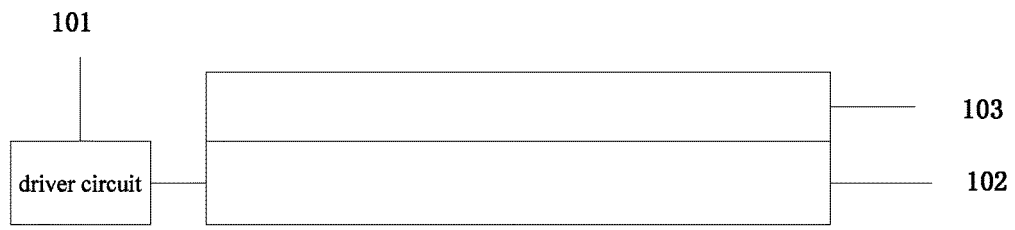
FIG. 1 is a schematic view showing a display device in some embodiments of the present disclosure.

REFERENCE SIGN LIST 101 driver circuit
102 display panel
103 interference unit
1031 front light source
1032 light valve
104 first controller
105 second controller
106 third controller
107 backlight source
200 shutter glasses

DETAILED DESCRIPTION OF THE EMBODIMENTS

The present disclosure will be described hereinafter in conjunction with the drawings and embodiments. The following embodiments are for illustrative purposes only, but shall not be used to limit the scope of the present disclosure.

Referring to FIG. 1, which is a schematic view showing a display device in some embodiments of the present disclosure, the display device includes a driver circuit 101, a display panel 102, and an interference unit 103 arranged at a display side of the display panel 103. The driver circuit 101 is configured to drive the display panel 102 to display an image, and a time period for each frame of the image includes a display period and an interference period. During the display period, the interference unit 103 is in a transparent state so as to enable light beams from the display panel 102 to pass through the interference unit 103, and within the interference period, the interference unit 103 is in an interference state so as to interfere with the light beams from the display panel 102.

Figure 2:
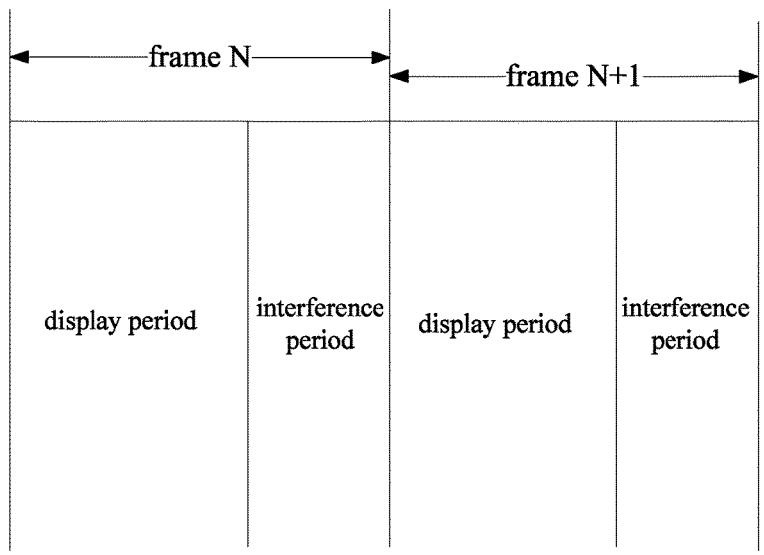
FIG. 2 is a schematic view showing a time period for each frame of image in some embodiments of the present disclosure.

Referring to FIG. 2, which is a schematic view showing the time period for each frame in some embodiments of the present disclosure (N is a positive integer), the time period for each frame of the image includes the display period and the interference period following the display period. In addition, the display periods for all frames of the image have an identical duration, and so do the interference periods. Of course, in some other embodiments of the present disclosure, the interference period may be followed by the display period.

The interference unit 103 is arranged at the display side of the display panel 102, and configured to enable the light beams from the display panel 102 to pass through the interference unit 103 or interfere with the light beams from the display panel 102. The so-called "display side" refers to a side of the display panel 102 for displaying the image, i.e., a side facing a viewer.

The display device may cooperate with a pair of shutter glasses. During the display period, the interference unit 103 is in the transparent state, so as to enable the light beams from the display panel 102 to pass through the interference unit 103. At this time, the pair of shutter glasses is also in a transparent state, so the viewer who wears the pair of shutter glasses may view the image displayed by the display panel 102. During the interference period, the interference unit 103 is in the interference state, so as to interfere with the light beams from the display panel 102. At this time, the pair of shutter glasses is in a light-shielding state, so the viewer who wears the pair of shutter glasses may view the image normally but the other people who do not wear the pair of shutter glasses may not view the image. As a result, it is able to prevent the other people from peeping at the image.

There may be various interference units 103, and some of them will be described hereinafter.

In some embodiments of the present disclosure, the interference unit 103 may include a front light source. The front light source may be turned off during the display period, so as to be in the transparent state and enable the light beams from the display panel 102 to pass through the front light source. In addition, it may be turned on during the interference period to emit light, so as to be in the interference state and interfere with the light beams from the display panel 102.

Figure 3:
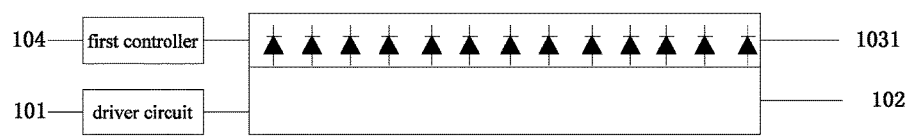
FIG. 3 is another schematic view showing the display device in some embodiments of the present disclosure.

Optionally, referring to FIG. 3, the front light source 1031 may be a transparent white OLED substrate, which is in the transparent state in the case of being powered off, and which emits white light so as to be in the interference state in the case of being powered on.

Of course, the front light source 1031 may further be a transparent OLED substrate capable of emitting the light in any other colors. In the case of being powered off, the OLED substrate may be in the transparent state, and in the case of being powered on, it may emit monochromatic light, including but not limited to red light, blue light, green light and yellow light, so as to be in the interference state.

In some embodiments of the present disclosure, there may exist a one-to-one, many-to-one or one-to-many correspondence between pixels of the OLED substrate and pixels of the display panel.

Optionally, in some embodiments, the display device may further include a first controller 104 configured to turn off the front light source 1031 during the display period so as to enable the front light source 1031 to be in the transparent state, or turn on the front light source 1031 during the interference period so as to enable the front light source 1031 to emit light, thereby to enable the front light source 1031 to be in the interference state.

The display device may cooperate with a pair of shutter glasses. During the display period, the front light source 1031 is in the transparent state, so as to enable the light beams from the display panel 102 to pass through the front light source 1031. At this time, the pair of shutter glasses is also in a transparent state, so the viewer who wears the pair of shutter glasses may view the image displayed by the display panel 102. During the interference period, the front light source 1031 emits the light, so as to be in the interference state and interfere with the light beams from the display panel 102. At this time, the pair of shutter glasses is in a light-shielding state, so the viewer may view the image normally but the other people who do not wear the pair of shutter glasses may not view the image. As a result, it is able to prevent the other people from peeping at the image.

In some embodiments of the present disclosure, the interference unit 103 may include a light valve, which is turned on during the display period so as to be in the transparent state and enable the light beams from the display panel 102 to pass through the light valve, and which is turned off during the interference period so as to be in the interference state and interfere with the light beams from the display panel 102.

Figure 4:
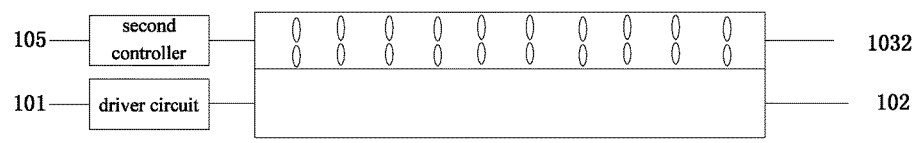
FIG. 4 is yet another schematic view showing the display device where a liquid crystal light valve is in a transparent state in some embodiments of the present disclosure.
Figure 5:
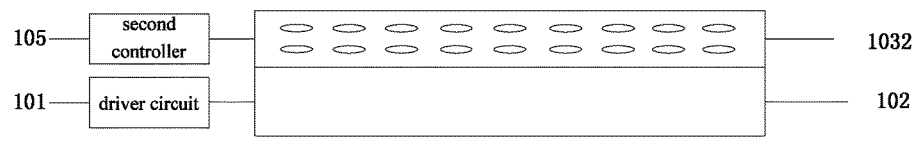
FIG. 5 is still yet another schematic view showing the display device where the liquid crystal light valve is in an interference state in some embodiments of the present disclosure.

Referring to FIGS. 4 and 5, in some embodiments of the present disclosure, the light valve 1032 is a liquid crystal light valve, which is turned on during the display period so as to be in the transparent state and enable the light beams from the display panel 102 to pass through the light valve 1032, and which is turned off during the interference period so as to be in the interference state and interfere with the light beams from the display panel 102.

The light valve may also be an electrochromic unit. Optionally, in the case of being powered off, the electrochromic unit may be in the transparent state so as to enable the light beams from the display panel 102 to pass through the electrochromic unit, and in the case of being powered on, the electrochromic unit may be in black or any other color so as to shield the light beams from the display panel 102.

Of course, in some other embodiments of the present disclosure, the light valve of any other type may also be used.

Optionally, in some embodiments of the present disclosure, the display device may further include a second controller 105 configured to turn on the light valve 1032 during the display period so as to be in the transparent state, or turn off the light valve 1032 within the interference period so as to be in the interference state.

The display device may cooperate with a pair of shutter glasses. During the display period, the light valve 1032 is in the transparent state, so as to enable the light beams from the display panel 102 to pass through the light valve 1032. At this time, the pair of shutter glasses is also in a transparent state, so the viewer who wears the pair of shutter glasses may view the image displayed by the display panel 102. During the interference period, the light valve 1032 emits the light, so as to be in the interference state and interfere with the light beams from the display panel 102. At this time, the pair of shutter glasses is in a light-shielding state, so the viewer may view the image normally but the other people who do not wear the pair of shutter glasses may not view the image. As a result, it is able to prevent the other people from peeping at the image.

Apart from the transparent OLED substrate or the light valve, the interference unit 103 may also be of any other type, e.g., an interference unit with a mechanical structure or an optical structure, which will not be particularly defined herein.

The display panel may be a liquid crystal display panel, an OLED display panel, or the like.

Figure 6:
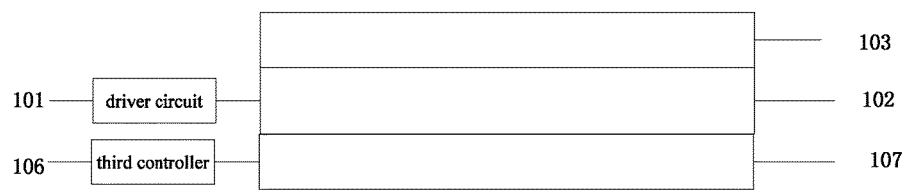
FIG. 6 is still yet another schematic view showing the display device in some embodiments of the present disclosure.

In the case that the display panel is a liquid crystal display panel, referring to FIG. 6, the display device may further include a backlight source 106, which is turned on during the display period and turned on or turned off during the interference period.

To be specific, during the interference period, in the case that the backlight source 106 is turned off, it is able to reduce the power consumption, and in the case that the backlight source 106 is turned on, it is able to prevent a service life of the backlight source 106 from being adversely affected due to the frequent turning-on and turning-off operations.

In the case that the backlight source 106 is turned off during the interference period, the display device may further include a third controller 107 configured to turn on the backlight source 106 during the display period and turn off the backlight source 106 during the interference period.

Optionally, the backlight source 106 may also be a white OLED substrate, so as to reduce the power consumption.

The first controller 104 (or the second controller 105) and the third controller 106 may be integrated as one controller, and integrated into an identical Printed Circuit Board (PCB) together with the driver circuit.

Optionally, in some embodiments of the present disclosure, the display device may operate in two display modes, i.e., a normal display mode and an anti-peep display mode. At this time, the display device may further include a display mode switching module configured to switch the display device between the normal display mode and the anti-peep display mode. In the anti-peep display mode, the driver circuit 101 is configured to drive the display panel 102 to display an image, and the time period for each frame of the image includes the display period and the interference period. In the normal display mode, the driver circuit 101 is configured to drive the display panel 102 to display an image, and the time period for each frame of the image merely includes the display period.

Figure 7:
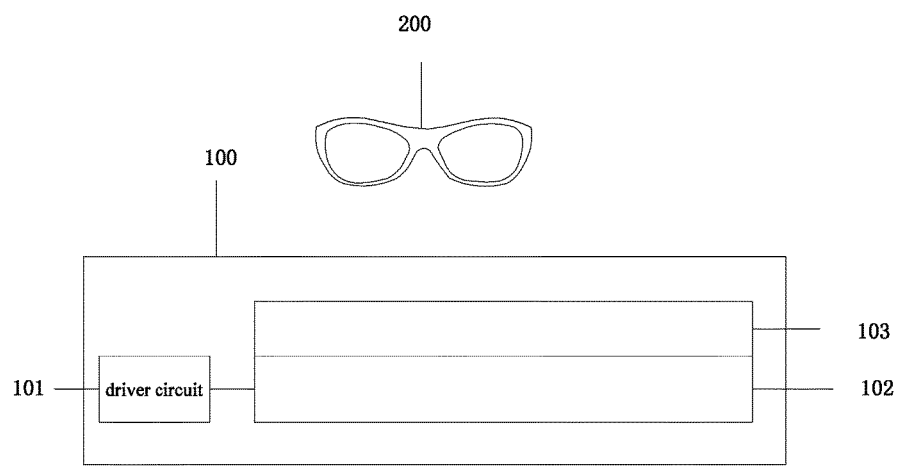
FIG. 7 is a schematic view showing a display system in some embodiments of the present disclosure.

Referring to FIG. 7, the present disclosure further provides in some embodiments a display system, which includes the above-mentioned display device 100 and a pair of shut glasses 200. The display device 100 includes the driver circuit 101, the display panel 102, and the interference unit 103 arranged at the display side of the display panel 103. The driver circuit 101 is configured to drive the display panel 102 to display an image, and the time period for each frame of the image includes the display period and the interference period. During the display period, the interference unit 103 is in the transparent state so as to enable the light beams from the display panel 102 to pass through the interference unit 103, and the pair of shut glasses 200 is in a transparent state. During the interference period, the interference unit 103 is in the interference state so as to interfere with the light beams from the display panel 102. The pair of shutter glasses 20 is in a light-shielding state during the interference period, so as to filter an interference signal, thereby to enable the viewer to view the image normally.

In some embodiments of the present disclosure, the pair of shutter glasses 200 may have two lenses, i.e., a left lens and a right lens, which are both in the transparent state during the display period and both in the light-shielding state during the interference period.

In some other embodiments of the present disclosure, the pair of shutter glasses may also have one lens, which is in the transparent state during the display period and in the light-shielding state during the interference period.

In some embodiments of the present disclosure, the lens of the pair of the shutter glasses may be liquid crystal light valve lens or the like.

It should be appreciated that, a switching frequency of the interference unit 103 between the transparent state and the interference state needs to be identical to a switching frequency of the pair of shutter glasses 200 between the transparent state and the light-shielding state. In other words, the pair of shutter glasses 200 needs to be in the transparent state while the interference unit 103 is in the transparent state, and the pair of shutter glasses 200 needs to be in the light-shielding state while the interference unit 103 is in the interference state.

Hence, in some embodiments of the present disclosure, the display device needs to be in communication and synchronization with the pair of shutter glasses.

Optionally, in some embodiments of the present disclosure, the pair of shutter glasses 200 may include a first communication module, and the display device 100 may include a second communication module in communication with the first communication module, and a synchronization module configured to synchronize the transparent state and the interference state of the interference unit with the transparent state and the light-shielding state of the pair of shutter glasses respectively.

The display device 100 may be in communication with the pair of shutter glasses 200 in a wired or wireless manner.

The present disclosure further provides in some embodiments a display method, which includes steps of: providing an image for the display panel, where the time period for each frame includes the display period and the interference period; enabling the interference unit at the display side of the display panel to be in the transparent state during the display period, so as to enable the light beams from the display panel to pass through the interference unit; and enabling the interference unit to be in the interference state during the interference period, so as to interfere with the light beams from the display panel.

The above are merely the preferred embodiments of the present disclosure. Obviously, a person skilled in the art may make further modifications and improvements without departing from the spirit of the present disclosure, and these modifications and improvements shall also fall within the scope of the present disclosure.

What is claimed is:

1. A display device, comprising a driver circuit, a display panel, and an interference unit arranged at a display side of the display panel, the interference unit comprising a front light source, wherein the driver circuit is configured to drive the display panel to display an image, and a time period for each frame of the image comprises a display period and an interference period;

during the display period, the front light source is turned off to be in a transparent state so as to enable light beams from the display panel to pass through the interference unit; and during the interference period, the front light source is turned on to emit light and to be in an interference state so as to interfere with the light beams from the display panel.

2. The display device according to claim 1, wherein the front light source is a transparent white organic light-emitting diode (OLED) substrate.

3. The display device according to claim 1, further comprising a first controller configured to turn off the front light source so as to enable the front light source to be in the transparent state, or turn on the front light source so as to enable the front light source to emit light, thereby to enable the front light source to be in the interference state.

4. The display device according to claim 1, wherein the interference unit comprises a light valve, which is turned on during the display period so as to be in the transparent state and turned off during the interference period so as to be in the interference state.

5. The display device according to claim 4, wherein the light valve is a liquid crystal light valve.

6. The display device according to claim 4, wherein the light valve is an electrochromic unit.

7. The display device according to claim 4, further comprising a second controller configured to turn on the light valve so as to enable the light valve to be in the transparent state, or turn off the light valve so as to enable the light valve to be in the interference state.

8. The display device according to claim 1, wherein the display panel is a liquid crystal display panel, and the display device further comprises a backlight source which is turned on during the display period and turned on or turned off during the interference period.

9. The display device according to claim 1, wherein the display panel is an OLED display panel.

10. The display device according to claim 8, further comprising a third controller configured to turn on or turn off the backlight source.

11. A display system, comprising the display device according to claim 1 and a pair of shutter glasses which is in a transparent state during the display period and in a light-shielding state during the interference period.

12. The display system according to claim 11, wherein the pair of shutter glasses comprises a first communication module;

the display device further comprises a second communication module configured to communicate with the first communication module; and a synchronization module configured to synchronize the transparent state and the interference state of the interference unit with the transparent state and the light-shielding state of the pair of shutter glasses respectively.

13. The display system according to claim 12, wherein the synchronization module is further configured to control the pair of shutter glasses to be in the transparent state when the interference unit is in the transparent state, control the pair of the shutter glasses to be in the light-shielding state when the interference unit is in the interference state, and enable a switching frequency of the interference unit between the transparent state and the interference state to be identical to a switching frequency of the pair of shutter glasses between the transparent state and the light-shielding state.

14. A display method for use in the display system according to claim 11, comprising: providing an image for a display panel, wherein a time period for each frame of the image comprises a display period and an interference period;

enabling the front light source of the interference unit at the display side of the display panel to be turned off to be in the transparent state during the display period so as to enable light beams from the display panel to pass through the interference unit;

enabling the front light source of the interference unit to be turned on to emit light and to be in the interference state during the interference period so as to interfere with the light beams from the display panel.

15. The display method according to claim 14, wherein the pair of shutter glasses is in the transparent state during the display period, and the pair of shutter glasses is in the light-shielding state during the interference period.

16. The display method according to claim 14, wherein the interference unit is turned on during the display period so as to be in the transparent state, and the interference unit is turned off during the interference period so as to be in the interference state.

17. The display method according to claim 16, wherein the pair of shutter glasses is in the transparent state during the display period, and the pair of shutter glasses is in the light-shielding state during the interference period.

18. The display device according to claim 1, wherein during the interference period, the front light source is turned on to emit visible light and to be in the interference state so as to interfere with the light beams from the display panel.

19. A display method, comprising: providing an image for a display panel, wherein a time period for each frame of the image comprises a display period and an interference period;

enabling a front light source of an interference unit at a display side of the display panel to be turned off to be in a transparent state during the display period so as to enable light beams from the display panel to pass through the interference unit;

enable the front light source of the interference unit to be turned on to emit light and to be in an interference state during the interference period, so as to interfere with the light beams from the display panel.

* * * * *